US007991809B2

(12) United States Patent
Yellapragada (10) Patent No.: US 7,991,809 B2
(45) Date of Patent: Aug. 2, 2011

(54) SYSTEM AND METHOD FOR MANAGING ZONE INTEGRITY IN A STORAGE AREA NETWORK

(75) Inventor: Subrahmanya Sarma Yellapragada, Hyderabad (IN)

(73) Assignee: Computer Associates Think, Inc., Islandia, NY (US)

( * ) Notice: Subject to any disclaimer, the term of this patent is extended or adjusted under 35 U.S.C. 154(b) by 1064 days.

(21) Appl. No.: 11/757,676

(22) Filed: Jun. 4, 2007

(65) Prior Publication Data

US 2008/0301147 A1    Dec. 4, 2008

(51) Int. Cl.
*G06F 7/00*        (2006.01)
(52) U.S. Cl. ........................................ 707/827; 707/829
(58) Field of Classification Search .................. 707/827, 707/829

See application file for complete search history.

(56) References Cited

U.S. PATENT DOCUMENTS

| 2004/0024887 | A1* | 2/2004 | Grabauskas et al. ........... 709/229 |
| 2006/0077909 | A1* | 4/2006 | Saleh et al. .................... 370/254 |
| 2008/0034147 | A1* | 2/2008 | Stubbs et al. .................. 710/315 |

OTHER PUBLICATIONS

"San Data Security & Fabric Management", *Datalink*, printed from http://www.www.storagesearch.com/datalink-art1.html, Jul. 2002, 7 pages.
King, Chris, "Zoning: The Key to Flexible SAN Management", *QLogic White Paper*, 2002, 8 pages.

* cited by examiner

*Primary Examiner* — Shahid Alam
*Assistant Examiner* — Donald Lawson
(74) *Attorney, Agent, or Firm* — Pillsbury Winthrop Shaw Pittman LLP (57) ABSTRACT

A system and method for managing zone integrity in a storage area network (SAN) is provided. A SAN fabric may be partitioned into one or more zone sets, where each zone set may include a plurality of zones. A topology of any of the zones may be modified, without compromising zone integrity, by converting the zone into a topologically dynamic zone. The zone may be converted by redefining members of the zone in terms of their respective member definitions, which may be specific attributes used to identify the members in the fabric. As such, zone integrity may be preserved when a topology of any member of the converted zone is modified.

15 Claims, 4 Drawing Sheets

SYSTEM AND METHOD FOR MANAGING ZONE INTEGRITY IN A STORAGE AREA NETWORK

FIELD OF THE INVENTION

The invention relates to a system and method for managing zone integrity in a storage area network.

BACKGROUND OF THE INVENTION

In environments with significant needs for managing and accessing data, a storage area network (SAN) often tends to be a solution of choice. SANs may be implemented using various technologies (e.g., Fibre Channel), which offer advantages such as data centralization, high-speed performance, and ease of data access, among others. In environments making use of a SAN, various entities within an organization can easily share storage resources. For example, whereas a storage system would otherwise be bound or attached to an associated host, in SAN environments, the storage system can be decoupled from the associated host for sharing on a high-speed network. Although sharing storage in this manner network can provide various advantages, such as noted above, SANs must also be configured for containment to control or otherwise manage access to the storage systems (e.g., for preventing unauthorized or accidental access to resources, or for balancing resources among various entities, or for other reasons). As a result, many SAN implementations use zoning techniques to compartmentalize or otherwise organize storage devices into logical groupings.

While SAN zoning can provide various advantages over an uncontained SAN (e.g., by segregating access to storage devices, or appropriately allocating storage resources, among other things), zoning also implicitly binds a SAN topology. When a SAN is further segregated into zones, however, any subsequent changes to the topology may affect zone integrity. Correlatively, to sustain zone integrity, it may be necessary to bind the SAN topology. Thus, using existing techniques for dividing a SAN into zones, it may be difficult or impracticable to update a SAN topology, to troubleshoot devices, or to perform other SAN management tasks, as modifying topological aspects of the SAN would compromise zone integrity.

Existing systems suffer from these and other problems.

SUMMARY OF THE INVENTION

According to various aspects of the invention, a system and method for managing zone integrity in a storage area network (SAN) may address these and other drawbacks of existing systems. For example, a SAN fabric may be partitioned into one or more zone sets, where each zone set may include a plurality of zones. When a SAN administrator (or other user) has a need to modify a topology of a zone (e.g., to troubleshoot or upgrade a device, or for any other reason), that zone may be converted into a topologically dynamic zone (e.g., "TD-Zone"). For example, converting the zone into a topologically dynamic zone may include redefining one or more members of the zone in terms of their respective member definitions (e.g., a device identity attribute). By redefining the members of the converted zone using member definitions, which remain associated with a device regardless of subsequent topological changes, zone integrity may be preserved when modifying a topology of any zone member (e.g., by relocating, reconfiguring, recabling, or otherwise managing the member).

According to various aspects of the invention, each zone set in a SAN fabric may include a transit zone, which may operate as a logical zone abstraction, used as a placeholder when converting a zone into a topologically dynamic zone. For example, an iterative conversion process may include selecting each member of the zone in subsequent iterations. A member definition for each of the selected members may be added to the transit zone, where the member definition may include one of a node World Wide Name (nWWN) or a port World Wide Name (pWWN), among others. However, when the selected member is a switch port defined by a domain identifier and a port number, a member definition associated with an endpoint coupled the switch port may be added, where the endpoint member definition may include an nWWN or a pWWN, among others. When member definitions have been added to the transit zone for every member of the zone being converted, the zone members may be deleted, and subsequently replaced with the member definitions in the transit zone. As such, the zone has been converted into a topologically dynamic zone, and any member thereof can be relocated within the SAN fabric (i.e., a topology of the member may be modified) without compromising zone integrity for the topologically dynamic zone.

According to various aspects of the invention, a SAN fabric may include one or more zone sets, one of which may be active at any given time. Further, each zone set may include one or more zones, and each zone in the fabric may belong to one or more zone sets. When a zone has been selected for conversion into a topologically dynamic zone, zone sets to which the selected zone belongs may be identified. When any one of the identified zone sets is the active zone set, a transit zone associated with the active zone set may be selected for use during the conversion. The active zone set's transit zone may be selected, for example, because using an inactive zone set's transit zone would compromise zone integrity when replacing active zone members (e.g., the active zone set may continue to provide communication among the zone members using its transit zone). However, when the zone being configured is not a member of the active zone set (i.e., each zone set to which the zone belongs is inactive), a transit zone associated with any of the zone sets to which the zone belongs may be selected (e.g., because the active zone set does not include the selected zone).

Other objects and advantages of the invention will be apparent to those skilled in the art based on the following drawings and detailed description.

DETAILED DESCRIPTION

Figure 1:
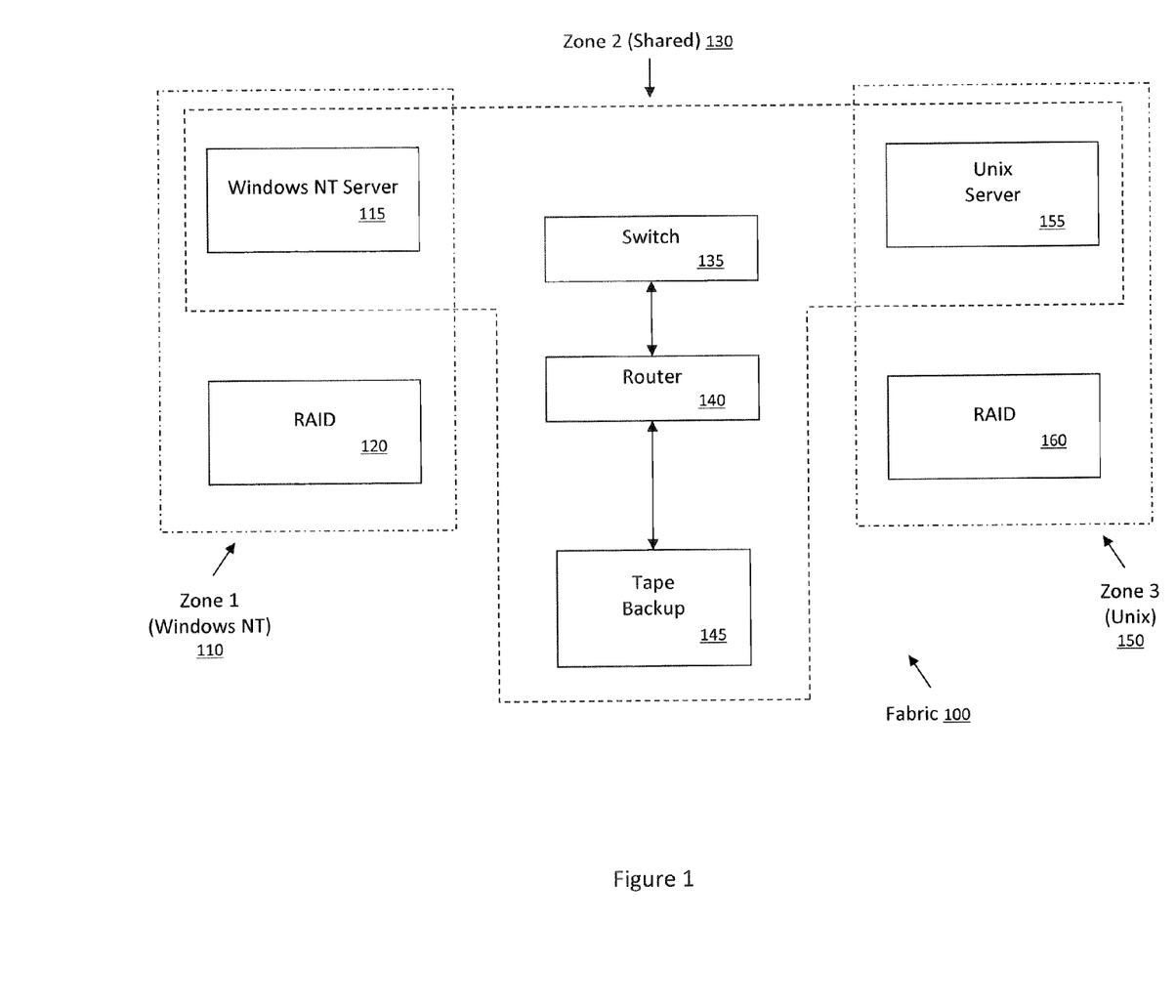
FIGS. 1-2 illustrate an exemplary storage area network (SAN) zone set according to various aspects of the invention.

Referring to FIG. 1, an exemplary storage area network (SAN) zone set is illustrated according to various aspects of the invention. As shown in FIG. 1, a SAN may include at least one fabric 100, where fabric 100 may include one or more switches 135 (e.g., a Fibre Channel switch) communicatively coupled to one or more host devices (e.g., a Windows NT server 115, a Unix server 155, or any other suitable host device), as well as one or more storage systems (e.g., a Redundant Array of Independent Disks (RAID) system 120 and/or 160, a tape backup system 145, or any other suitable storage system). Fabric 100 may further include one or more communications devices, such as a router 140, which may handle various aspects of traffic, load balancing, data routing, or other aspects of network communication occurring in fabric 100.

Furthermore, it will be apparent that any given SAN implementation may include one or more fabrics 100, and that each fabric 100 may include any suitable combination of networking devices (e.g., hubs, switches, routers, VoIP nodes, or other suitable networking devices), host devices (e.g., workstations, servers, or other suitable host devices), or storage systems (e.g., solid state disks, RAID systems, tape backup systems, or other suitable storage systems), among other things. Thus, any given SAN fabric 100 may potentially include a very large number of devices or nodes, such that effective SAN management may use zoning techniques to provide critical management features, such as secure data access and data integrity, among others. For example, a SAN fabric 100 including a fully public switch 135 may potentially include up to millions of nodes, which may be unmanageable without using zones to partition, segregate, or otherwise allocate storage systems to host devices.

For example, FIG. 1 illustrates fabric 100 segregated into an exemplary zoning arrangement, with a first zone 110 including a first RAID system 120 allocated to a Windows NT server 115, a third zone 150 including a second RAID system 160 allocated to a Unix server 155, and a second zone 130 including a tape backup system 145 shared by Windows NT server 115 and Unix server 155. Such a zoning arrangement may provide advantages for managing SAN fabric 100, for example, because Windows NT server 115 and Unix server 155 may run different operating systems, which may access or utilize storage systems in different, possibly incompatible, ways. For example, a Windows NT server 115 may automatically attempt to write a disk signature to newly identified disks or other storage systems attached to fabric 100. As such, various storage systems may be allocated to the Windows NT server 115 to segregate access from hosts or devices requiring access to storage with unwritten disk signatures. Although using zoning techniques to segregate fabric 100 provides various advantages, a topology of member devices may implicitly be bound to the zoning. As such, troubleshooting, upgrading, or otherwise modifying the topology cannot be done without compromising integrity of the zoning.

It will be apparent that hosts, storage systems, or other suitable devices may be organized or otherwise partitioned into zones in various ways, and for various reasons, as appropriate for any given implementation (e.g., systems may be zoned based on application, function, organizational rules, logical unit number (LUN), or any other suitable criteria). Thus, a SAN fabric 100 may be a heterogeneous environment including any suitable combination of devices, where zones (e.g., zones 110, 130, 150, etc.) may be used to keep devices separate, prevent conflicts between devices, or otherwise control interaction among devices in fabric 100. It will further be apparent that various different zoning techniques may exist (e.g., zone configuration techniques may vary for different switch vendors). For example, zoning techniques may include hard zoning (e.g., a routing table in a switch may regulate data transfers according to a World Wide Name (WWN) used to identify each device in a zone), soft zoning (e.g., a name server database may store a port number or a WWN used to identify a device, and a Registered State Change Notification (RSCN) may be used to notify the database about a zone change for the device), switch vendor-specific zoning (e.g., QLogic port-based zoning, Brocade "Hard Port" enforced zoning, etc.), or various combinations thereof.

As shown in FIG. 1, fabric 100 may be divided into a Windows NT zone 110, a shared zone 130, and a Unix zone 150. Each zone may be implemented using one of a number of techniques, including hard zoning, soft zoning, port zoning, WWN zoning, name server zoning, broadcast zoning, or segmented loop zoning, among various others. Further, zones may implement vendor-specific zoning techniques (e.g., QLogic switches may use name server zoning based on ports, WWNs, or other criteria, Brocade switches may use enforced zoning based on hard or soft porting, hard WWNs, or other criteria, or other vendors may implement other suitable technology). Fabric 100 may therefore use various combinations of zoning techniques to divide fabric 100 into separate fabrics, zone sets, zones, or other organizations based on specific uses or needs for a given implementation.

Figure 2:
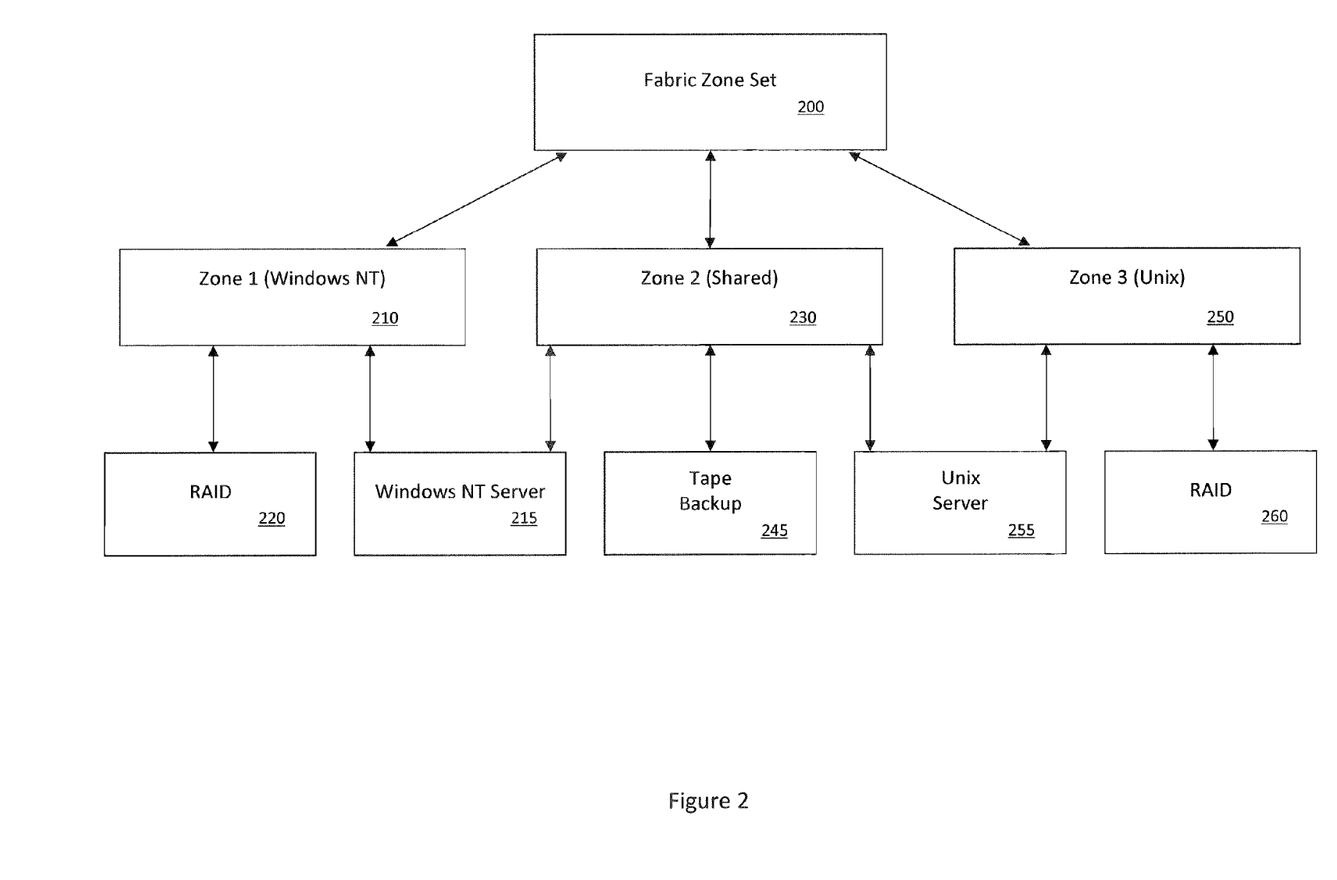

Referring to FIG. 2, an exemplary SAN zone set 200 is illustrated according to various aspects of the invention. Any given SAN implementation may be configured to segregate or partition a fabric into one or more zone sets 200. Although a SAN fabric may include more than one zone set 200, only one zone set 200 may be active in the fabric at a time, with all other zone sets remaining inactive. Further, a zone set may include one or more zones, and each zone may include one or more members. As will be apparent, zone members may include servers, storage systems, nodes, switches, other devices, as well as various ports associated therewith, each of which can access each other through managed connections. Further, every member of a zone can recognize and communicate with other members in the zone, while access and connectivity to members of other zones may be restricted (e.g., zone members may be restricted to intra-zone communication). However, as a member can belong to a plurality of zones, and a zone can belong to a plurality of zone sets, connectivity may be achieved between members of discrete zones or zone sets via one or more members that have been configured for multiple zones or zone sets (i.e., a member of a zone can only access other members of that zone, but any member can also be a member of other zones).

For example, FIG. 2 illustrates a zone set 200 defining a hierarchical relationship among member devices (e.g., networking devices, hosts, storage systems, or other devices) of the SAN fabric shown in FIG. 1. Zone set 200 may include a Windows NT zone 210, a shared zone 230, and/or a Unix zone 250, among others. Windows NT zone 210 may include a Windows NT server 215 and a RAID system 220; shared zone 230 may include Windows NT server 215, a tape backup system 245, and a Unix server 255; and Unix zone 250 may include Unix server 255 and a RAID system 260. Thus, RAID system 220 may only communicate with other members of Windows NT zone 210 (i.e., Windows NT server 215), and RAID system 260 may only communicate with other members of Unix zone 250 (i.e., Unix server 255). However, data may nonetheless be moved from RAID system 220 and/or RAID system 260 to a member of shared zone 230 (e.g., tape backup 245) via shared members. For example, Windows NT server 215 and Unix server 255 have both been configured for shared zone 230, in addition to Windows NT zone 210 and Unix zone 250, respectively. Thus, Windows NT server 215 or Unix server 255 may retrieve data from RAID system 220 and/or 260, respectively, and may transfer the retrieved data to tape backup system 245.

Thus, as each member device can belong to one or more zones, and each zone can belong to one or more zone sets, certain devices may be shared across zones or zone sets, as appropriate. Further, switches, hubs, routers, workstations, servers, storage systems, or other member devices can be identified within various zones via a member definition (e.g., unique identifiers for attributes of a device or a port), such as a World Wide Name (WWN) (e.g., a 64-bit unique identifier for each node in a fabric), a Port Number (e.g., a 64-bit unique identifier for each port that connects a node to a network), or other suitable member definitions, as will be apparent, and as described in greater detail below.

Although FIG. 2 illustrates a SAN fabric having a single zone set 200, it will be apparent that the fabric has been illustrated as such for ease of description only. Thus, in various implementations, a SAN fabric may include one or more zone sets, each of which may include one or more zones, each of which may further include one or more members. Correlatively, each member may belong to one or more zones, and each zone may belong to one or more zone sets. Accordingly, although zoning may be useful in defining physical, logical, or other relationships among fabric member devices, zoning may also implicitly bind the fabric topology. As a result of these implicit bindings, any topological changes may undermine zone integrity in the fabric (i.e., zone integrity may only be guaranteed by persistently binding the topology).

As such, existing zoning techniques may have various disadvantages, such as interfering with effective troubleshooting, system upgrades, or SAN reconfiguration, among other things. Thus, as described in greater detail below, various aspects of the invention may include converting a zone into a topologically dynamic zone to enable modification of a topology for any member of the topologically dynamic zone (e.g., a "TD-Zone"). For example, converting the zone may include redefining each member of the zone in terms of a member definition (e.g., physical characteristics, or device-specific attributes, such as a unique node World Wide Name). As such, an implicitly bound topology may be made explicit, enabling the members of the topologically dynamic zone to be disconnected, recabled, upgraded, relocated, or otherwise topologically modified, with complete preservation of zone integrity.

Figure 3:
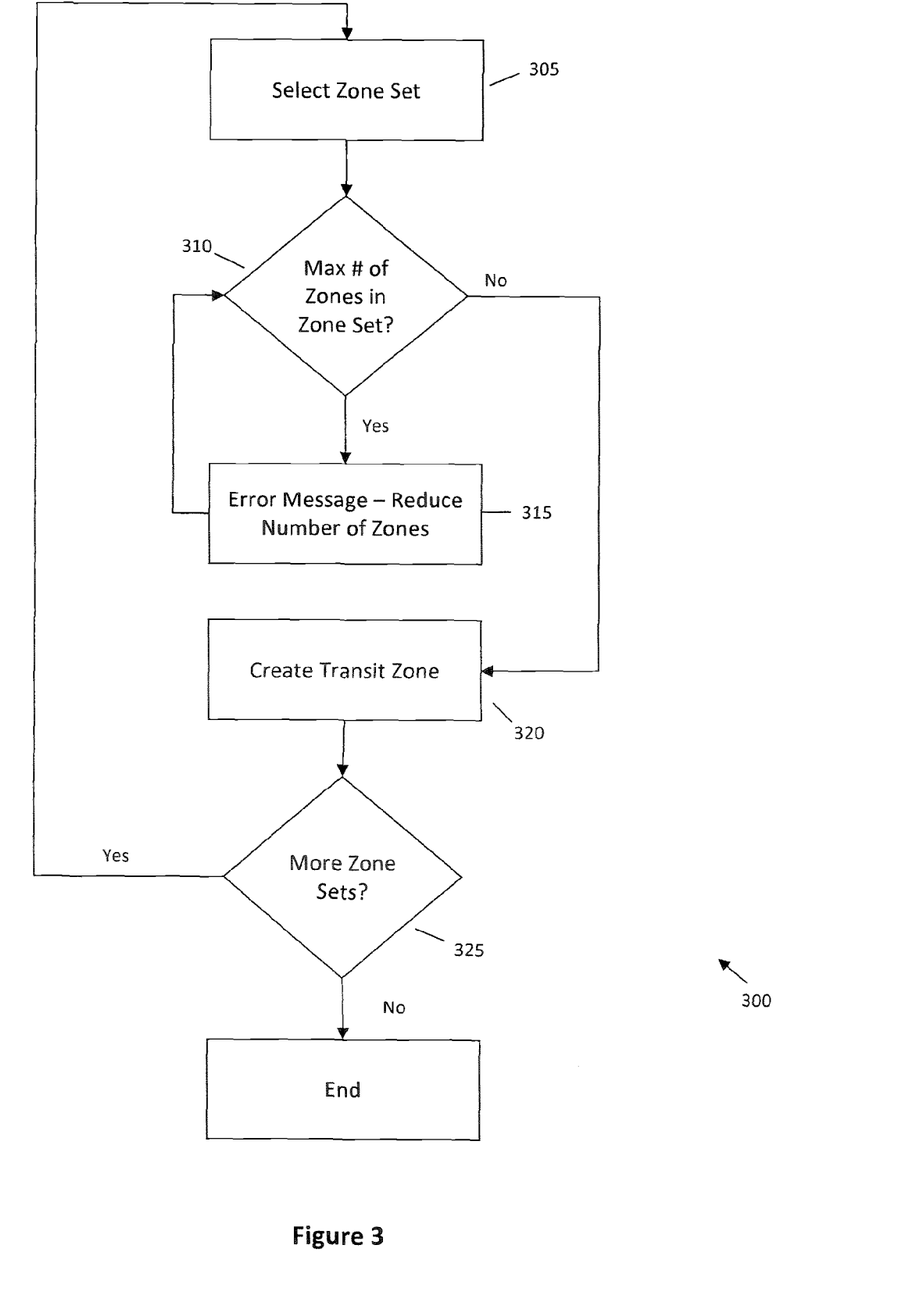
FIG. 3 illustrates an exemplary method for creating transit zones in a SAN fabric according to various aspects of the invention.

Referring to FIG. 3, an exemplary method 300 for creating transit zones in a SAN fabric is illustrated according to various aspects of the invention. The transit zones may operate as logical zone abstractions, used as placeholders when converting zones into topologically dynamic zones. Method 300 may include an iterative process of selecting each zone set in the SAN fabric, and creating a reserved zone in each zone set to be used as the transit zone.

Method 300 may begin in an operation 305, where a zone set may be selected from a group of one or more zone sets in a SAN fabric. Subsequently, a decisional operation 310 may determine whether creating a transit zone in the selected zone set would exceed a predetermined maximum number of zones permitted in the selected zone set. For example, switch vendors or manufacturers may define the predetermined maximum number of zones that can exist in zone sets for their switches. When decisional operation 310 determines that the selected zone set already includes the maximum number of zones permitted, method 300 may proceed to an operation 315, where an error message may be generated. The error message may indicate to a user (e.g., a SAN administrator, engineer, or other user) that a transit zone cannot be created in the selected zone set because it includes the maximum number of zones. The error may further instruct the user to reduce the number of zones in the zone set so that the transit zone can be created. For example, the user may use any suitable SAN management application (e.g., CA BrightStor® SAN Manager, or any other suitable management application) to reduce the number of zones in the zone set. Method 300 may continue to loop through operations 310 and 315 until the number of zones in the zone set is less than the predetermined maximum number.

When decisional operation 310 determines the selected zone set to include less than the predetermined maximum number of zones, method 300 may branch to an operation 320, where a zone may be reserved in the selected zone set. Operation 320 may further include designating the reserved zone as a transit zone for the selected zone set, thereby creating a logical zone abstraction in the zone set that can be used to convert zones included therein into topologically dynamic zones. A subsequent control operation 325 may trigger another iteration of method 300, where method 300 may repeat until each zone set includes a transit zone.

Figure 4:
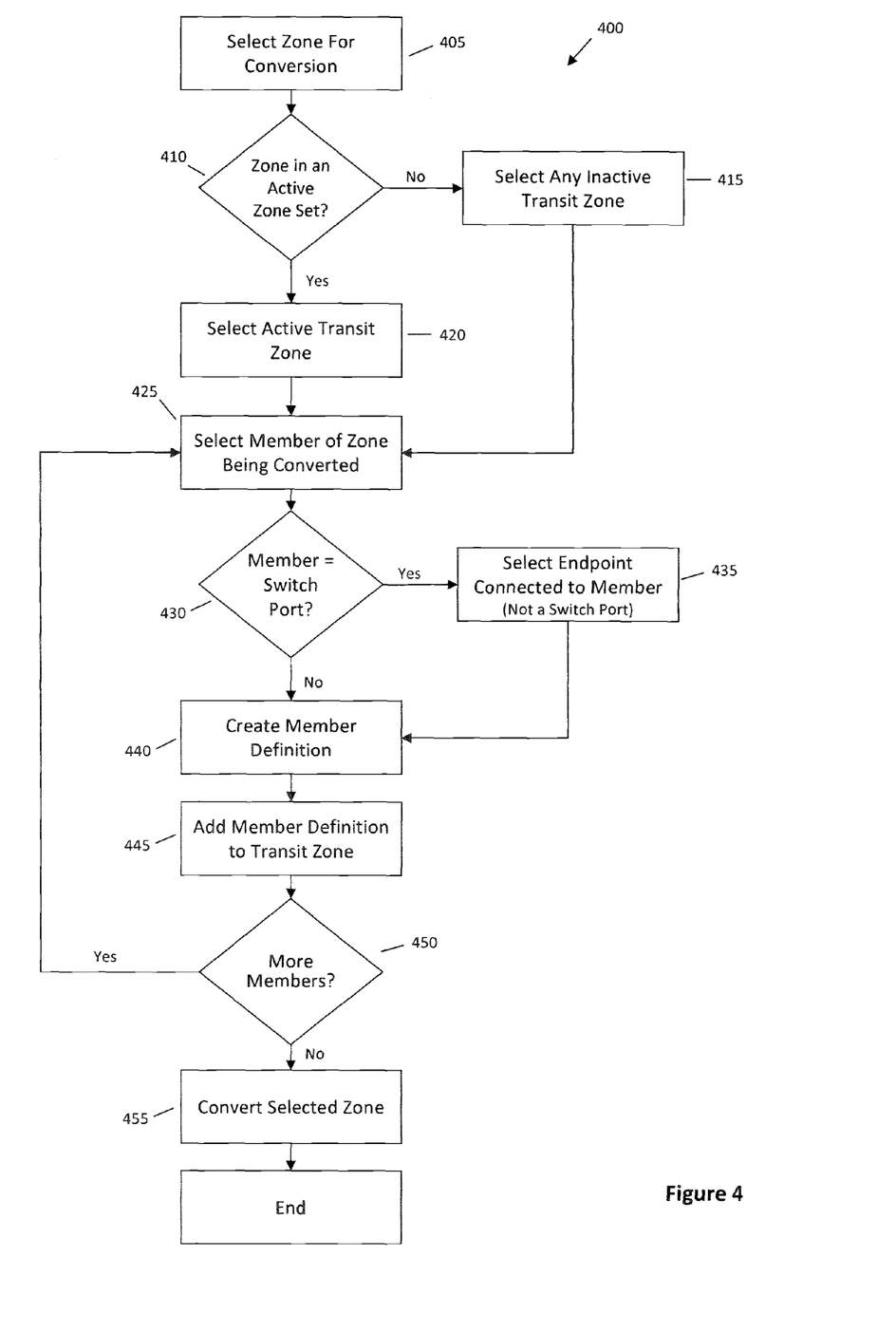
FIG. 4 illustrates an exemplary method for converting a zone to a topologically dynamic zone according to various aspects of the invention.

Referring to FIG. 4, an exemplary method 400 for converting a zone into a TD-Zone is illustrated according to various aspects of the invention. Once a transit zone has been created in a zone set, method 400 may be used to preserve zone integrity for a zone about to experience a change in topology, among other things. For example, any member of a zone that has been converted in accordance with method 400 may retain zone integrity, regardless of subsequent topological changes relating to the member.

Method 400 may begin in an operation 405, where a user (e.g., a SAN administrator, engineer, or other user) may select a zone to be converted into a TD-Zone. For example, the user may select the zone in operation 405 using a graphical user interface for SAN management, and selecting an option to convert the zone to a TD-Zone. It will be apparent, however, that the zone may be selected automatically, or using any suitable mechanism, without limitation.

Subsequently, a decisional operation 410 may determine whether the selected zone belongs to an active zone set. For example, as described above, a SAN fabric may include various zone sets, only one of which can be active at any given time. Although a currently active zone set may be changed by deactivating the active zone set, prior to activating another zone set, such a change may be difficult to perform while input/output activity is occurring in the SAN fabric, or for other reasons. As such, decisional operation 410 will not alter a currently active zone set. Rather, when the selected zone belongs to the SAN's active zone set, a transit zone associated with the active zone set may be selected in an operation 420. The active zone set's transit zone may be selected because using an inactive zone set's transit zone would compromise zone integrity when replacing active zone members (e.g., the active zone set may continue to provide communication among the zone members using its transit zone). However, when each zone set to which the zone belongs is inactive, decisional operation 410 may branch to an operation 415. In operation 415, a transit zone associated with any inactive zone set to which the selected zone belongs may be selected (e.g., because the active zone set does not include the selected zone).

Subsequently, each member of the zone being converted into the TD-Zone may be configured. In various implementations, prior to iteratively configuring each member of the zone, the zone being converted and/or the active zone set may be locked. Further, a message may be displayed on a graphical user interface to notify a user of the locking (e.g., to prevent users or other processes from modifying states associated therewith). For example, the locking may account for recurring or iterative processes of creating transit zones (e.g., as described in FIG. 3), or converting zones into TD-Zones (e.g., as described in FIG. 4). As such, the locking may prevent other processes from reading, writing, or otherwise modifying variables used to convert the zone, thereby ensuring consistency during the conversion.

In an operation 425, a member of the zone being converted may be selected for configuration. A decisional operation 430 may include determining whether the selected member is a switch port (e.g., a switch entity used to connect a node to a network). If the selected member is a switch port, method 400 may branch to an operation 435 for identifying a suitable peer of the switch port. For example, the switch port peer may be any endpoint coupled to the switch port, where the endpoint cannot itself be a switch port. By selecting the endpoint rather than the switch port, the endpoint may be recabled or relocated in the fabric, thereby enabling a user to troubleshoot the switch without compromising the zoning.

When the member selected in operation 425 is not a switch port, a member definition for the selected member may be created in an operation 440. Alternatively, when the member is a switch port, operation 440 may include creating a member definition for the endpoint. The member definition may identify an attribute associated with the member (or endpoint), such as a unique identifier used to identify the member (or endpoint) in the SAN fabric. For example, the created member definition may be one of a node World Wide Name (nWWN) (i.e., a 64-bit identifier for a node in a fabric), a port World Wide Name (pWWN) (i.e., a 64-bit identifier for a port in the fabric), or another suitable member definition, as will be apparent. For example, an nWWN may be an address on a host bus adapter or a storage device, or a pWWN may be assigned to a device when the device registers itself with a fabric. Other variations will be apparent.

The created member definition may then be added to the transit zone in an operation 445. Subsequently, a control operation 450 may iteratively determine whether the zone being converted includes any additional members, in which case method 400 returns to operation 425 to iteratively add member definitions to the transit zone for each additional member. As member definitions are iteratively added to the transit zone (i.e., in subsequent operations 425-445), the member definitions may be optimized. For example, in various implementations, a node in a SAN fabric may include one or more ports. The node's member definition may be an nWWN for the node, while each port may have a pWWN member definition. As such, when the transit zone includes pWWN member definitions for every port associated with a node, the member definitions may be optimized by replacing all of the pWWN member definitions with a corresponding nWWN member definition (i.e., because the nWWN implicitly identifies all of the pWWNs). Similarly, when a zone includes pWWN member definitions for one or more ports associated with a node, subsequently adding an nWWN member definition for the node may result in the pWWN member definitions being removed automatically (i.e., because the nWWN implicitly identifies all of the pWWNs). In still another example, when the transit zone includes an nWWN member definition for a node (i.e., implicitly identifying all associated pWWNs), subsequent removal of any of the associated pWWNs may result in the nWWN member definition being replaced by all of the associated pWWNs, less the removed pWWN. Other variations will be apparent.

When control operation determines that the selected zone does not include any additional members for configuring, method 400 may subsequently proceed to an operation 455 for finalizing the zone's conversion into a topologically dynamic zone. Upon reaching operation 455, the transit zone used during conversion method 400 will include member definitions for each member of the selected zone. The member definitions, being based on specific attributes associated with the members, may therefore remain bound to the members regardless of subsequent changes to their topology. Accordingly, operation 455 may convert the selected zone into a topologically dynamic zone by removing, deleting, or otherwise clearing every member from the zone being converted. The zone, being empty, may then be populated with the member definitions that had previously been added to the transit zone. Operation 455 may also include a clean-up process, where the transit zone may be cleared of any member definitions added during method 400, such that the transit zone can be used to convert other zones into topologically dynamic zones. Method 400 may then end, and the selected zone may be topologically dynamic, where relocation, reconfiguration, recabling, upgrading, troubleshooting, or other activity can occur for any member of the zone. As the zone members have been redefined in terms of specific attributes, which remain consistent within the entire SAN fabric, the TD-Zone members may undergo topological changes without affecting integrity of the zone.

Implementations of the invention may be made in hardware, firmware, software, or any combination thereof. The invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described in the above disclosure in terms of specific exemplary aspects and implementations of the invention, and performing certain actions. However, those skilled in the art will recognize that such descriptions are merely for convenience and that such actions in fact result from computing devices, processors, controllers, or other devices executing the firmware, software, routines, or instructions.

Aspects and implementations may be described as including a particular feature, structure, or characteristic, but every aspect or implementation may not necessarily include the particular feature, structure, or characteristic. Further, when a particular feature, structure, or characteristic is described in connection with an aspect or implementation, it is understood that it is within the knowledge of one skilled in the art to effect such feature, structure, or characteristic in connection with other aspects or implementations whether or not explicitly described. Thus, various changes and modifications may be made, without departing from the scope and spirit of the invention. The specification and drawings are to be regarded as exemplary only, and the scope of the invention is to be determined solely by the appended claims.

What is claimed is:

1. A method for managing zone integrity in a storage area network, wherein the storage area network includes a switched fabric having a logical zoning that partitions the switched fabric into one or more zones that belong to one or more zone sets, the method comprising:
    selecting at least one of the one or more zones associated with the switched fabric, wherein the selected zone has one or more members;
    creating one or more member definitions to uniquely identify the one or more members in the selected zone based on attributes uniquely associated with the one or more member, wherein the one or more member definitions remain bound to the one or more members regardless of changes to a physical topology associated with the switched fabric; and converting the selected zone into a topologically dynamic zone, wherein converting the selected zone into the topologically dynamic zone includes:
  clearing the one or more members from the selected zone; and
  replacing the one or more members cleared from the selected zone with the one or more member definitions to populate the selected zone and convert the selected zone into the topologically dynamic zone, wherein having the one or more member definitions in the topologically dynamic zone remain bound to the one or more members enables relocating the one or more members within the physical topology associated with the switched fabric without affecting the logical zoning that partitions the switched fabric.

2. The method of claim 1, wherein the one or more members include one or more of a port or a node having one or more ports.

3. The method of claim 2, wherein the one or more member definitions include one or more of a port World Wide Name or a node World Wide Name that implicitly identifies the port World Wide Name.

4. The method of claim 1, wherein the one or more members include a switch port and the created member definition associated with the switch port uniquely identifies a non-switch port endpoint connected to the switch port.

5. The method of claim 1, wherein the one or more zone sets include an active zone having a transit zone, and wherein converting the selected zone into the topologically dynamic zone further includes:
  adding the one or more member definitions to the transit zone associated with the active zone, wherein the one or more member definitions added to the transit zone are used to replace the one or more members cleared from the selected zone; and
  clearing the one or more member definitions from the transit zone in response to populating the selected zone and converting the selected zone into the topologically dynamic zone, wherein clearing the one or more member definitions from the transit zone enables using the transit zone to convert additional zones into topologically dynamic zones.

6. A computer readable medium storing computer executable instructions for managing zone integrity in a storage area network, wherein the storage area network includes a switched fabric having a logical zoning that partitions the switched fabric into one or more zones that belong to one or more zone sets, wherein executing the computer-executable instructions on a processing device causes the processing device to:
  select at least one of the one or more zones associated with the switched fabric, wherein the selected zone has one or more members;
  create one or more member definitions to uniquely identify the one or more members in the selected zone based on attributes uniquely associated with the one or more member, wherein the one or more member definitions remain bound to the one or more members regardless of changes to a physical topology associated with the switched fabric; and
  convert the selected zone into a topologically dynamic zone, wherein to convert the selected zone into the topologically dynamic zone, the computer-executable instructions further cause the processing device to:
    clear the one or more members from the selected zone; and
    replace the one or more members cleared from the selected zone with the one or more member definitions to populate the selected zone and convert the selected zone into the topologically dynamic zone, wherein having the one or more member definitions in the topologically dynamic zone remain bound to the one or more members enables relocating the one or more members within the physical topology associated with the switched fabric without affecting the logical zoning that partitions the switched fabric.

7. The computer readable medium of claim 6, wherein the one or more members include one or more of a port or a node having one or more ports.

8. The computer readable medium of claim 7, wherein the one or more member definitions include one or more of a port World Wide Name or a node World Wide Name that implicitly identifies the port World Wide Name.

9. The computer readable medium of claim 6, wherein the one or more members include a switch port and the created member definition associated with the switch port uniquely identifies a non-switch port endpoint connected to the switch port.

10. The computer readable medium of claim 6, wherein the one or more zone sets include an active zone having a transit zone, and wherein to convert the selected zone into the topologically dynamic zone, the computer-executable instructions further cause the processing device to:
  add the one or more member definitions to the transit zone associated with the active zone, wherein the one or more member definitions added to the transit zone are used to replace the one or more members cleared from the selected zone; and
  clear the one or more member definitions from the transit zone in response to populating the selected zone and converting the selected zone into the topologically dynamic zone, wherein clearing the one or more member definitions from the transit zone enables using the transit zone to convert additional zones into topologically dynamic zones.

11. A system for managing zone integrity in a storage area network, wherein the storage area network includes a switched fabric having a logical zoning that partitions the switched fabric into one or more zones that belong to one or more zone sets, the system comprising one or more processing devices configured to:
  select at least one of the one or more zones associated with the switched fabric, wherein the selected zone has one or more members;
  create one or more member definitions to uniquely identify the one or more members in the selected zone based on attributes uniquely associated with the one or more member, wherein the one or more member definitions remain bound to the one or more members regardless of changes to a physical topology associated with the switched fabric; and
  convert the selected zone into a topologically dynamic zone, wherein to convert the selected zone into the topologically dynamic zone, the one or more processing devices are further configured to:
    clear the one or more members from the selected zone; and
    replace the one or more members cleared from the selected zone with the one or more member definitions to populate the selected zone and convert the selected zone into the topologically dynamic zone, wherein having the one or more member definitions in the topologically dynamic zone remain bound to the one or more members enables relocating the one or more members within the physical topology associated with the switched fabric without affecting the logical zoning that partitions the switched fabric.

12. The system of claim 11, wherein the one or more members include one or more of a port or a node having one or more ports.

13. The system of claim 12, wherein the one or more member definitions include one or more of a port World Wide Name or a node World Wide Name that implicitly identifies the port World Wide Name.

14. The system of claim 11, wherein the one or more members include a switch port and the created member definition associated with the switch port uniquely identifies a non-switch port endpoint connected to the switch port.

15. The system of claim 11, wherein the one or more zone sets include an active zone having a transit zone, and wherein to convert the selected zone into the topologically dynamic zone, the one or more processing devices are further configured to:
- add the one or more member definitions to the transit zone associated with the active zone, wherein the one or more member definitions added to the transit zone are used to replace the one or more members cleared from the selected zone; and
- clear the one or more member definitions from the transit zone in response to populating the selected zone and converting the selected zone into the topologically dynamic zone, wherein clearing the one or more member definitions from the transit zone enables using the transit zone to convert additional zones into topologically dynamic zones.

\* \* \* \* \*